United States Patent [19]

Nelson

[11] Patent Number: 4,922,708
[45] Date of Patent: May 8, 1990

[54] STARTING SYSTEM FOR TURBINE ENGINES

[75] Inventor: Charles A. Nelson, Union Lake, Mich.

[73] Assignee: Williams International Corporation, Walled Lake, Mich.

[21] Appl. No.: 305,163

[22] Filed: Feb. 2, 1989

[51] Int. Cl.⁵ ............................................ F02C 7/236
[52] U.S. Cl. .................................... 60/39.141; 60/734
[58] Field of Search ............... 60/39.141, 39.281, 734; 137/568, 571, 797

[56] References Cited

U.S. PATENT DOCUMENTS

| | | | |
|---|---|---|---|
| 3,696,612 | 10/1972 | Berman | 60/39.141 |
| 3,908,360 | 9/1975 | Meyer | 60/39.281 |
| 3,945,539 | 3/1976 | Sossong | 222/386.5 |
| 3,946,551 | 3/1976 | Linebrink et al. | 60/39.141 |
| 4,208,871 | 6/1980 | Kiple | 60/39.281 |

Primary Examiner—Louis J. Casaregola
Attorney, Agent, or Firm—Lyman R. Lyon

[57] ABSTRACT

A starting system for a turbine engine comprises a single D.C. electric motor that drives both a positive displacement fuel pressure boost pump and a positive displacement metering pump. A multiple position recirculation valve is positioned between the metering pump and a starting fuel reservoir for shunting fuel to tank so as to enable the D.C. motor to rapidly achieve full speed. When start parameters are sensed by a computer, the recirculation valve is closed which directs full fuel pressure to the starting fuel reservoir.

1 Claim, 1 Drawing Sheet

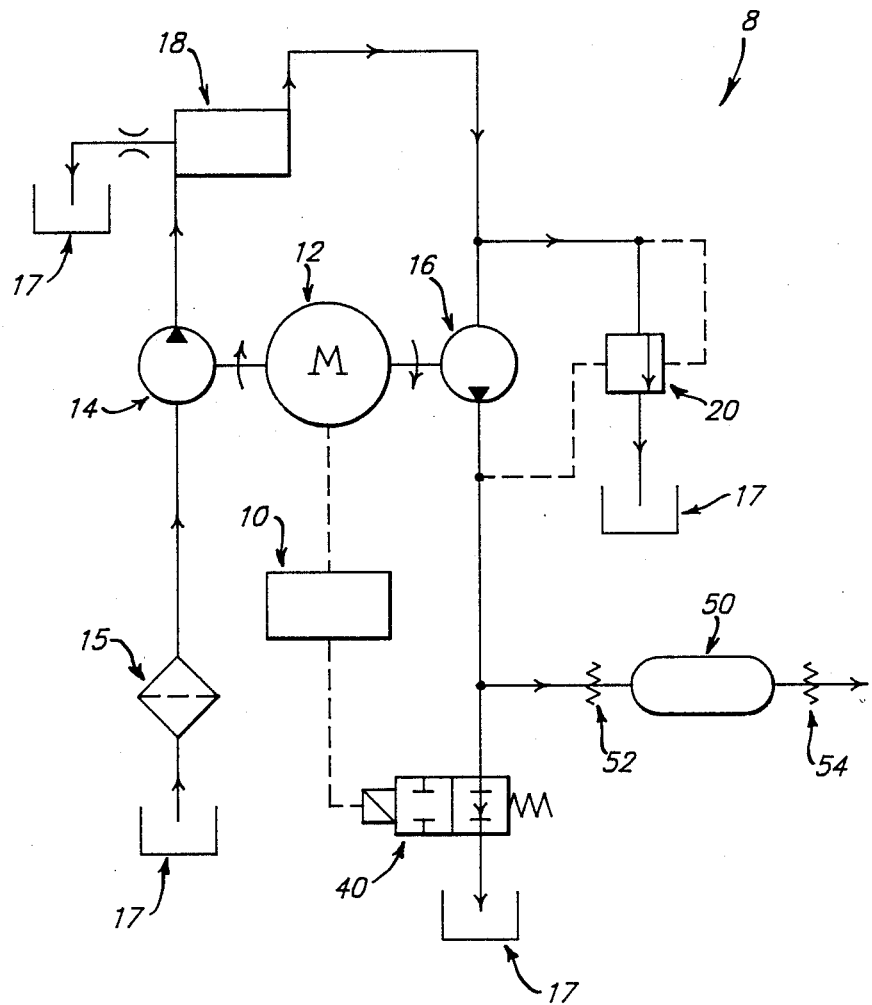

STARTING SYSTEM FOR TURBINE ENGINES

BACKGROUND OF THE INVENTION

This invention relates generally to fuel systems and more particularly to an improved starting system for a turbine engine.

One requirement of a turbine engine fuel system is that it be capable of generating a relatively large fuel pressure at low engine speed incident to start-up and engine acceleration. Known fuel control systems generally solve this problem by incorporating a variable displacement pump or by using an oversize fixed displacement pump to provide the required flow at low speeds. However, variable displacement pumps are complex, relatively unreliable, and more costly than fixed displacement pumps, and oversize fixed displacement pumps are inefficient over the normal operating range of the engine.

Therefore, there is a need for a fuel system that utilizes a fixed displacement pump to provide the necessary capacity and fuel metering accuracy required during turbine start-up and acceleration in accordance with a predetermined start-up and acceleration schedule.

Stated in another manner, typical fuel control systems for turbine engines incorporate a high speed engine gearbox mounted boost pump, filter, metering valve, pressure regulator, and control linkages or electronics. If the fuel-tank is remote to the engine a tank boost pump is also used. Fuel flow is not possible without engine rotation of about 10% of rated speed. These systems are not consistent with low cost turbine engine system goals as the cost of these relatively complex components designed to withstand the harsh engine mounted environment are high, and their complexity results in relatively low reliability. Furthermore, any fuel flow desired to purge fuel lines of accumulated vapor, or air, is not possible prior to engine rotation. Such vapor, or air, if allowed to pass to the engine during starting, can lower starting reliability.

SUMMARY OF THE INVENTION

The fuel system of the instant invention comprises a brushless D.C. Motor that concomitantly drives a fixed displacement fuel pump and a fixed displacement metering pump. The D.C. motor provides for variable speed operation of the fixed displacement pumps. The rate of fuel delivery to the engine is controlled by a computer which is adapted to sense a plurality of engine parameters, such as compressor discharge pressure, shaft speed and inlet temperature. The computer applies a signal to the motor which, based on the displacement of the metering pump, is indicative of optimum fuel flow and is determinative of the speed of the motor. The fuel pump and the metering pump may be mounted in or near the main fuel tank since they are driven by the single brushless D.C. motor. The boost pump provides fuel pressure and is of larger displacement than the metering pump. The excess fuel delivered by the boost pump is shunted back to the tank by the pressure regulator to maintain the pressure differential across the metering pump at a small value to ensure that the effect of internal leakage on its delivery is minimized.

Flow from the metering pump is initially shunted back to tank through a computer controlled recirculation valve. Thus, minimum back pressure is presented to the pumps to permit rapid acceleration thereof. Closure of the recirculation valve results in the instantaneous application of full fuel flow and pressure to burst discs on opposite sides of a starting fluid reservoir thereby automatically biasing the starting fluid to the engine ahead of the run fuel flow.

A zero, or near zero, differential pressure regulator is utilized to minimize the tolerance requirements of the metering pump while obtaining high metering accuracy.

A vapor separator is utilized to remove any vapor in the fuel prior to the metering pump, thus minimizing metering errors due to vapor within the metering element. This also minimizes tank pressurization requirements to avoid vapor related pumping/metering problems.

The fuel system may be operated independently of engine speed. A recirculation valve just prior to a starting fuel reservoir permits purging of all fuel lines and components prior to engine rotation and ensures accurate metering during the critical start phase of the engine.

The disclosed system does not require a gear box mount and drive pad on the engine.

BRIEF DESCRIPTION OF THE DRAWING

The drawing comprises a simplified block diagram of a fuel system according to the invention.

DETAILED DESCRIPTION OF THE PREFERRED EMBODIMENT OF THE INVENTION

Referring to FIG. 1, a fuel system 8 comprises an electronic computer 10 which controls the speed of a brushless D.C. electric motor 12. The motor 12 drives both a positive displacement boost pump 14 and a positive displacement metering pump 16. The boost pump 14 is in series flow relationship with a fuel tank 17, fuel filter 15, vapor separator 18, differential pressure regulator 20, and the metering pump 16. The metering pump 16 functions to control the flow of fuel which has been pressurized by the positive displacement pump 14 to a level appropriate for delivery to the turbine engine as determined by the computer 10.

In accordance with one feature of the instant invention, fuel metered by the metering pump 16 flows to a multiple position electronically controlled recirculation valve 40. The valve 40, prior to a start signal from the computer 10, is open so as to shunt fuel back to the tank 17. In this condition, no fuel pressure is applied on starting fluid contained in a starting fuel reservoir 50. The reservoir 50 is sealed on opposite sides thereof by conventional burst disks 52 and 54.

In operation, after receipt of a start signal from the computer 10, the boost pump 14 and the metering pump 16 are energized, rapidly bringing fuel flow to a maximum condition due to the fact that the recirculation valve 40 is in the shunt condition permitting fuel flow to tank 17 thereby eliminating back pressure on the pumps 14 and 16. While pump speed is rapidly maximized, fuel pressure developed is insufficient to burst the disk 52 due to the open recirculation valve 40. When the desired start parameters are met as sensed by the computer 10, the valve 40 is closed applying full fuel pressure to the disk 52 effecting rupture thereof, advancement of the slug of starting fuel in the reservoir 50, bursting of the disk 54, and supplying the engine (not shown) with a charge of highly volatile starting fuel.

From the foregoing it should be apparent that a fuel system according to the invention is not only simple and inexpensive, but is also advantageous in a number of other respects. For example, since both the boost and metering pumps are driven independently of the engine, they may be positioned in the fuel tank. Thus, the need for tank pressurization, normally required to charge a downstream pumping station for preventing excessive vapor to liquid ratios and line pressure drop which may result in cavitation, is eliminated. Furthermore, engine light-off flow of a special starting fuel can be achieved independent of engine speed since the metering pump is driven independently of the engine. In addition, since the power required to run the main pump motor and therefore acceleration thereof is a function of metered flow, minimum power demands are imposed during engine starting since back pressure is minimized.

While the preferred embodiment of the invention has been disclosed, it should be appreciated that the invention is susceptible of modification without departing from the scope of the following claims.

I claim:

1. A starting system for a turbine engine comprising:
   a fuel tank,
   a D.C. electric motor,
   a positive displacement fuel pressure boost pump connected to said fuel tank and driven by said motor for raising the pressure of fuel from said tank to a desired level,
   a positive displacement metering pump in series fluid flow relation to said boost pump and driven by said motor for delivering a metered fuel flow to the engine,
   a pressure regulator in parallel flow relationship with said metering pump,
   a starting fuel reservoir in series relationship with said metering pump and the engine,
   first and second burst disks on opposite sides of said reservoir,
   a multiple position recirculation valve between said metering pump and said starting fuel reservoir movable from a first position wherein fuel is shunted to said tank to a second position wherein fuel is directed solely to said starting fuel reservoir, positioning of said recirculation valve in the second position applying full fuel pressure from said metering pump to said first burst disk, thence to starting fuel in said fuel reservoir, thence to said second burst disk so as to bias the starting fuel in said reservoir to the engine.

* * * * *